Aug. 30, 1938.     J. A. MARTIN     2,128,754
SPEED GOVERNOR
Filed July 26, 1935
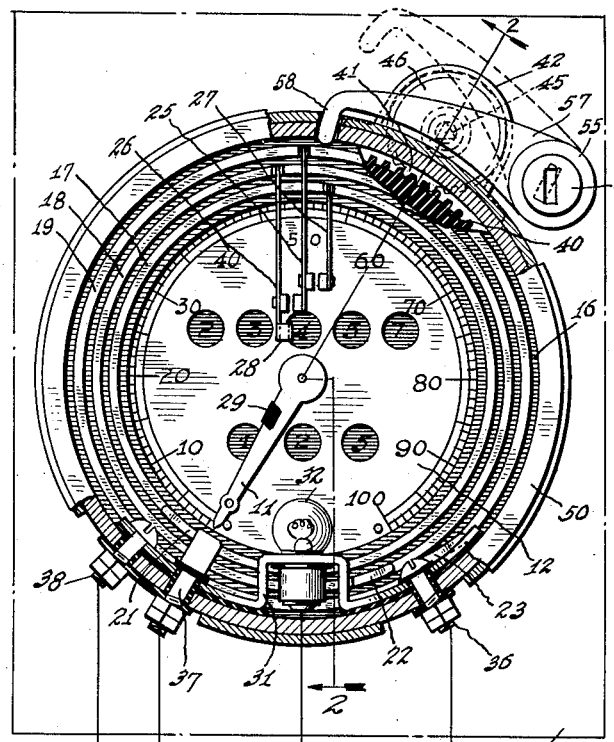
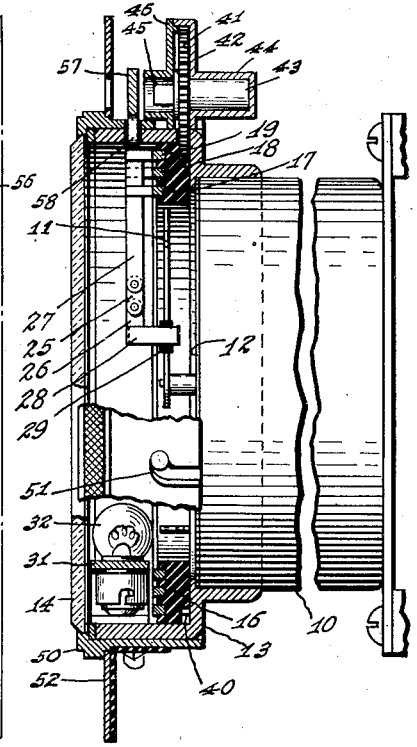
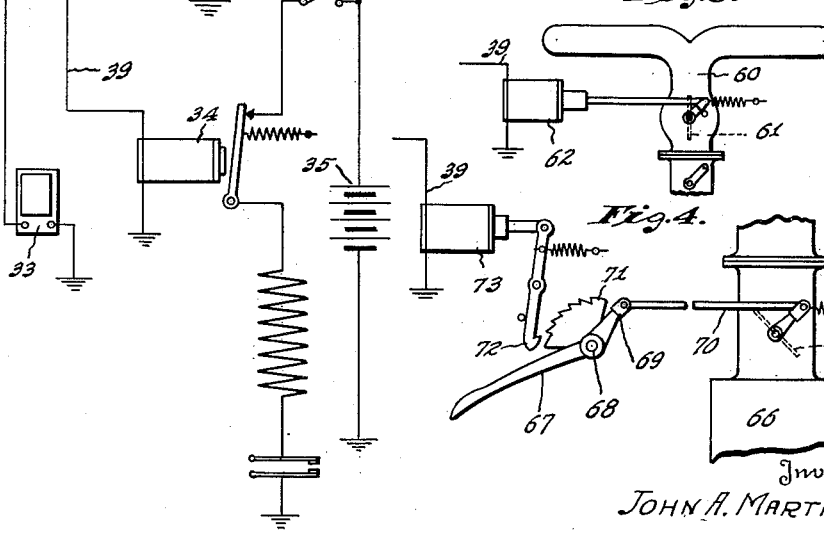
Inventor
JOHN A. MARTIN,
By
Attorneys Patented Aug. 30, 1938

2,128,754

UNITED STATES PATENT OFFICE 2,128,754

SPEED GOVERNOR

John A. Martin, Indianapolis, Ind.

Application July 26, 1935, Serial No. 33,298

1 Claim. (Cl. 200—56)

My invention relates to speed governors for automobiles, and more specifically to speed governors of the type which can be associated with the conventional automobile speedometer. A further object of my invention is to produce a device of this kind which, while adjustable by authorized persons, can not be readily tampered with to change its adjustment or to alter the control it exercises. Still another object of my invention is to produce a speed governor in the operation of which the operator of the vehicle will be warned before the maximum predetermined speed limit is attained in order thereby to deter the operator from attempting some maneuver which the speed-limiting operation of the device would prevent. An additional object of my invention is to provide means whereby an indication will be given if the automobile is, as the result of unauthorized tampering with the speed-control mechanism, driven at a speed materially above that for which the speed-governing device is set.

In carrying out my invention, I associate with a speedometer having a movable speed-indicating hand, a rotatable ring mounted concentric with the hand; and from this ring I support three normally separated electrical contacts so arranged that in the movement of the hand they will be brought successively into engagement to complete various electrical circuits by means of which the functions performed by the device are effected. The angular position of the ring relative to the speedometer-dial determines the maximum speed, and the position of the ring is conveniently made adjustable through the use of adjusting mechanism which is normally locked. Conveniently, the adjustable ring is mounted within an extension of the speedometer housing which is locked to the speedometer housing, preferably by the same means employed to lock the adjusting mechanism.

The accompanying drawing illustrates my invention: Fig. 1 is a front elevation of a speedometer to which my invention has been applied, with parts thereof broken away and with electric connections indicated largely diagrammatically; Fig. 2 is a side elevation of the speedometer with parts thereof broken away and shown in section on the line 2—2 of Fig. 1; and Figs. 3 and 4 are diagrammatic illustrations of alternative means which may be employed in controlling the engine to limit its speed.

The speedometer illustrated in the drawing has a casing 10 which encloses any satisfactory form of speed-responsive mechanism controlling the angular position of an indicating hand 11 relative to a stationary graduated dial 12. For the purpose of providing protection for the hand 11 and dial 12 and in order to provide an enclosure for those portions of my invention which are directly associated with the speedometer, I provide for the casing 10 a forwardly projecting extension 13 closed at its outer end by a disk of glass 14 or other suitable transparent material.

Within the extension 13 I mount for rotational adjustment a ring 16 of insulating material in the outer face of which are embodied three concentric collector rings 17, 18, and 19 with which there respectively co-operate brushes 21, 22 and 23.

Supported from the ring 16 and connected respectively to the three collector rings 17, 18, and 19 are three spring-contact members 25, 26, and 27. These contact members project radially inwardly from the ring 16 and are normally disengaged from each other. That one of the spring contacts 25, 26, and 27 which is nearest to the zero position of the hand 11, here shown as the contact 26, is arranged to be engaged by the hand 11 in its movement and to be forced into contact with the intermediate spring-contact 25 and then to force such intermediate contact into engagement with the third spring contact 27. Conveniently, the outer end of the spring-contact 26 is provided with a rearward extension 28 disposed in the path of movement of a block 29 of insulating material carried by the hand 11.

The apparatus which it is the object of my invention to control may take different forms and is operated through the closure of electrical circuits effected by engagement of the contacts 25—26—27. As previously indicated, I prefer to incorporate in the device embodying my invention a warning signal which will indicate to the driver that any material increase in speed is impossible. Such warning signal may be in the form of a lamp, and may be mounted within the casing-extension 13. As shown, the lamp 32 is mounted in a bridge 31 secured to the inner face of the casing-extension 13 near the bottom thereof. Other apparatus shown in the drawing and adapted to be operated through closing of electrical circuit by engagement of the contacts 25—26—27 includes a buzzer 33 adapted to be operated simultaneously with the lamp, and a relay 34 which, when energized, renders the ignition system of the engine inoperative.

In the drawing, I have indicated a battery 35 one terminal of which is grounded and the other terminal of which is connected to a bolt 36 extending through the wall of the casing-extension 13. The bolt 36 may be employed to hold one leg of the bridge 31 in place, but the bolt is insulated from the bridge and from the casing-extension, and carries on its inner end the brush 23 engaging the outermost collector ring 19. The brush 22, which engages the intermediate collector ring 18, is mounted upon the bridge 31. The brush 21, which engages the innermost collector ring 17, is carried upon the inner end of a post 37 which is insulated from the casing and from the bridge. A bolt 38, electrically connected to the bridge 31 but insulated from the casing may co-operate with the bolt 36 in holding the bridge 31 in place.

One terminal of the lamp 32 is connected with the bridge 31, while the other terminal is grounded. One terminal of the buzzer 33 is connected to the bolt 38 and the other terminal is grounded, while the winding of the relay 34 is connected, by a wire 39, between the post 37 and ground. As indicated in the drawing, the relay 34 is so arranged that when energized it will render inoperative the engine ignition system, as by opening the primary side thereof.

By adjusting the angular position of the ring 16 the position of the contacts 25—26—27 may be varied to vary in turn the speed at which the governor operates to stop the engine.

Because the hand 11 must exercise an appreciable, though slight, force in displacing the contact members 25 and 26 it is essential that the speed-responsive mechanism in the casing 10 be of a type capable of exerting such a force. I have found any of the common types of centrifugal-force-responsive mechanisms to be suitable.

Preferably, means are provided for adjusting the angular position of the ring 16 from without the casing. To this end, the ring may be provided with a circumferentially extending series of gear teeth 40 meshing with a pinion 41 rotatably mounted within a housing 42 carried by the flange 13. As shown in the drawing, the pinion 41 has rigid with it a rearwardly extending stub shaft 43 rotatably supported in a journal 44 which is rigid with the housing 42. On its front face, the pinion 41 has a forwardly extending, non-circular boss 45 which is co-axial with the pinion and which is adapted to receive a key by means of which the pinion may be rotated. The front of the housing 42 is closed by a cover 46 which has a central opening for the passage of the adjusting key.

In order to permit access to the working parts of the device, the cover-glass 14 is preferably not mounted directly upon the flange 13, but instead is mounted in a ring 50 which telescopically receives the flange 13 and which is adapted to be held in place thereon as by the bayonet-lock 51 shown in Fig. 2.

As is clear from Fig. 2, the speedometer casing 10 and the flange 13 rigid with it are supported from the rear in line with an opening in the instrument board 52 of the automobile, and the ring 50 is arranged to pass through such opening into association with the flange 13. By rotating the ring slightly from the position shown in Fig. 2, the bayonet-lock 51 may be released and the ring withdrawn from the opening in the instrument board to expose the working parts of the device.

To prevent unauthorized changes in adjustments, I may mount in the instrument board 52 a lock 55 having a rotatable element 56 with which there is rigid an arm 57 adapted to be swung into and out of alinement with the central opening in the housing-cover 46. As shown in full lines in Fig. 1, the arm 57 is disposed over the opening in the housing-cover 46 to prevent insertion of the key which is necessary to rotate the pinion 42 and change the position of the ring 16. By operation of the lock 55, however, the arm 57 can be swung to the dotted-line position shown in Fig. 1 in which it uncovers the central opening in the cover 46 and makes it possible to insert the key, rotate the pinion 42, and change the setting of the ring 16.

In addition to its function in preventing access to the pinion 42, the arm 57 may also serve as a latch preventing unauthorized removal of the ring 50. For this purpose, the arm 57 may extend beyond the axis of the pinion 42 and may have its extreme outer end 58 bent inwardly to pass through holes of the ring 50 and flange 13, which holes are in alinement when the bayonet-lock 51 is locked.

Assuming that the ring 16 has been so adjusted as to adjust the contact members 25—26—27 in the proper position to effect the desired speed control, the operation of the device will be obvious. As the vehicle speed increases, the speedometer hand 11 may swing in a clockwise direction over the dial 12. As this movement of the hand continues, the block of insulating material 29 will eventually strike the projection 28 on the contact member 26 and will force such contact member into engagement with the middle contact member 25. This closes the circuit from the ungrounded terminal of the battery through the bolt 36, brush 23, collector ring 19, contact members 26 and 26, collector ring 18, brush 22, and the lamp 32 to ground. The resulting supply of current to the lamp causes it to light and warns the driver that the maximum speed is about to be attained. When the lamp 32 is lighted, the buzzer 33 or other warning signal in parallel with it is also actuated. Any continued increase in vehicle speed forces the middle contact 25 into engagement with the contact 27 thus completing the supply of battery current from the collector ring 19 through the contact members 25 and 27, collector ring 17, post 37, and wire 39 to the relay 34. When the relay 34 is energized, it operates as above set forth to open the primary side of the ignition system of the engine, thus rendering the engine inoperative and causing a decrease in the vehicle speed.

As the speed-governing function is exercised in accordance with the speed of the automobile rather than the speed of the engine, my device imposes no undue restriction on available power when the car is not running in high gear.

It is to be noted that the speedometer hand 11, in forcing the contacts 25 and 27 together, has to overcome the elastic resistance of both the contact members 25 and 26, which exert on the hand a force tending to move it in a counter-clockwise direction. As soon, therefore, as the vehicle speed decreases as the result of the opening of the ignition system, the contact members 25 and 26 force the hand 11 in a counterclockwise direction with the result that the contact members 25 and 27 are immediately separated and the relay 34 de-energized to close the primary side of the engine ignition system. As a result, the engine again becomes operative with but a slight delay.

The function of the resilient contact members 25 and 26 in immediately de-energizing the relay 34 is of considerable importance; for it prevents a quantity of explosive gases from collecting in the muffler and exhaust pipe of the engine where their subsequent explosion might result in considerable damage.

The contact member 26 and its extension 28 are preferably so proportioned as to yield and permit the hand 11 to pass beyond them if the force exerted by the hand becomes great enough. Should the operator, by tampering with the electrical connections or otherwise, be enabled to drive the automobile at a speed beyond that for which the ring 16 is set, the hand 11 would force the extension 28 aside and pass beyond it. Upon a later deceleration of the automobile the extension 28 would engage the hand and prevent its return to zero position, thus giving an indication that the automobile had been operated at excessive speed.

It is not essential that the control which my governor exerts on the engine be obtained through opening of the ignition circuit as shown in Fig. 1. Thus, in Fig. 3, I have shown the mixture-induction conduit 60 of the engine as provided with an auxiliary throttle 61 connected to the armature of a solenoid 62 which is connected between the wire 39 and ground. In the operation of this device, when the speed of the vehicle has reached the point such as to cause the hand 11 to force the contacts 25 and 27 into engagement with each other, the solenoid 62 will be energized, exactly as the relay 34 will be energized in the arrangement shown in Fig. 1, and the resultant movement of the armature will close the throttle 61 to decrease the speed of the engine and of the vehicle.

Another arrangement is illustrated in Fig. 4 where the customary throttle 65 of the engine-carburetor 66 is operated by an accelerator pedal 67. The accelerator pedal is rigid with a shaft 68 which carries an arm 69 connected by a link 70 with the throttle 65. The shaft 68 also has rigid with it a toothed sector 71 co-operating with which is a pawl 72 which is normally free from engagement with the teeth of the sector but which can be moved into engagement therewith by energization of the solenoid 73 connected between the wire 39 and ground. With such a device, when the hand 11 forces the contacts 25 and 27 together, the resultant energizing of the solenoid 73 forces the pawl 72 into engagement with the teeth of the sector 71 and prevents such movement of the shaft 68 as it is necessary to further open the throttle 65.

Not only can my advice be utilized as a speed governor; but by rotating the ring 16 to bring the contacts 25—26—27 close to the zero position on the dial 12, the device becomes an effective deterrent to theft of an automobile on which it is mounted.

I claim as my invention:

In a device of the type described, a scale, a hand movable thereover, speed-responsive means for moving said hand, a pair of co-operating electrical contacts, one of said contacts having a portion projecting into the path of movement of said hand, a support carrying said contacts and adjustable along the path of movement of said hand, a casing enclosing said contacts, said hand, and said support, said casing having a removable cover, an adjusting device for moving said support, and a lock for said adjusting device, said lock and cover having co-operating provisions for preventing removal of said cover when said lock is locked.

JOHN A. MARTIN.